United States Patent
Vadori et al.

(10) Patent No.: US 12,437,230 B2
(45) Date of Patent: Oct. 7, 2025

(54) SYSTEMS AND METHODS FOR RISK-SENSITIVE REINFORCEMENT LEARNING

(71) Applicant: JPMORGAN CHASE BANK, N.A., New York, NY (US)

(72) Inventors: Nelson Vadori, New York, NY (US); Sumitra Ganesh, Short Hills, NJ (US); Maria Manuela Veloso, Pittsburgh, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1129 days.

(21) Appl. No.: 17/154,825

(22) Filed: Jan. 21, 2021

(65) Prior Publication Data

US 2021/0232970 A1   Jul. 29, 2021

Related U.S. Application Data

(60) Provisional application No. 62/965,428, filed on Jan. 24, 2020.

(51) Int. Cl.
*G06N 20/00* (2019.01)
*G06Q 40/06* (2012.01)

(52) U.S. Cl.
CPC ............. *G06N 20/00* (2019.01); *G06Q 40/06* (2013.01)

(58) Field of Classification Search
None
See application file for complete search history.

(56) References Cited

U.S. PATENT DOCUMENTS

| | | | |
|---|---|---|---|
| 10,839,302 B2* | 11/2020 | Wright | G05B 13/0265 |
| 2007/0087756 A1* | 4/2007 | Hoffberg | G06Q 10/06375 |
| | | | 455/450 |
| 2011/0282801 A1* | 11/2011 | Marecki | G06Q 40/08 |
| | | | 705/36 R |
| 2020/0097808 A1* | 3/2020 | Thomas | G06Q 10/063 |
| 2020/0155101 A1* | 5/2020 | Yasunaga | A61B 5/7267 |
| 2021/0035214 A1* | 2/2021 | Kim | G06N 3/044 |
| 2021/0398061 A1* | 12/2021 | Acuna Agost | G06Q 10/067 |

OTHER PUBLICATIONS

Author(s):Ganesh, S Title: Reinforcement learning for market making Journal: ARXIV [online]. Publication date: 2019. [retrieved on: Nov. 18, 2023 ]. Retrieved from the Internet: < URL: https://arxiv.org/abs/1911.05892> (Year: 2019).*

(Continued)

*Primary Examiner* — David J Stoltenberg
(74) *Attorney, Agent, or Firm* — GREENBERG TRAURIG LLP (57) ABSTRACT

Systems and methods for risk-sensitive reinforcement learning are disclosed. In one embodiment, a method for a method for training a risk-sensitive reinforcement learning policy may include: (1) receiving, from a data source, a plurality of sets of training data for a plurality of time steps; (2) receiving a training budget comprising a plurality of episodes, a risk aversion coefficient, and an end state; and (3) calculating a correction factor using the training data. The correction factor may minimize stochasticity based on a risk aversion coefficient.

14 Claims, 4 Drawing Sheets

(56) References Cited

OTHER PUBLICATIONS

Author(s):Qi-Ming Title: Reinforcement learning algorithm Journal: IEEE [online]. Publication date: 2009. [retrieved on: Jun. 27, 2024 ]. Retrieved from the Internet: < URL: https://ieeexplore.ieee.org/stamp/stamp.jsp?tp=&arnumber=5170592> (Year: 2009).*
Author(s):Shen Title: Risk sensitive Reinforcement learning Journal: IEEE [online]. Publication date: 2014. [retrieved on: Jun. 20, 2025 ]. Retrieved from the Internet: < URL: https://ieeexplore.ieee.org/abstract/document/6855488> (Year: 2014).*

* cited by examiner

SYSTEMS AND METHODS FOR RISK-SENSITIVE REINFORCEMENT LEARNING

RELATED APPLICATIONS

This application claims priority to, and the benefit of, U.S. Provisional Patent Application Ser. No. 62/965,428 filed Jan. 24, 2020, the disclosure of which is hereby incorporated, by reference, in its entirety.

BACKGROUND OF THE INVENTION

1. Field of the Invention

Embodiments generally relate to systems and methods for risk-sensitive reinforcement learning.

2. Description of the Related Art

Reinforcement Learning is a major and well-studied field of AI (artificial intelligence). It aims at learning optimal policies in complex environments. For example, it may identify the optimal actions for an agent to take in order to maximize expected future gains (e.g., expected cumulative reward). Future gains are nevertheless unknown, and classical reinforcement learning aims at maximizing their expected value (e.g., a prediction of what the expected value may be).

SUMMARY OF THE INVENTION

Systems and methods for risk-sensitive reinforcement learning are disclosed. In one embodiment, a method for a method for training a risk-sensitive reinforcement learning policy may include: (1) a risk-sensitive learning engine comprising at least one computer processor receiving, from a data source, a plurality of sets of training data for a plurality of time steps, each set of training data comprising an initial state, an action, a reward, and a state at the next time step; (2) the risk-sensitive learning engine receiving a training budget comprising a plurality of episodes, a risk aversion coefficient, and an end state; (3) for each episode in the episode in the training budget: (a) the risk-sensitive learning engine initializing a Q table; (b) the risk-sensitive learning engine executing an action for time t=0 and monitoring a reward at t+1 and a state at time t+1; (c) the risk-sensitive learning engine increasing time t to t+1; (d) the risk-sensitive learning engine executing an action for time t and monitoring a reward at time t+1 and a state at time t+1; (e) the risk-sensitive learning engine calculating an average reward over time t; (f) the risk-sensitive learning engine calculating a correction factor based on the reward at time t+1, the average reward over time, and the risk aversion coefficient, wherein the correction factor minimizes stochasticity for the reward based on the risk aversion coefficient; and (g) repeating the steps of increasing time t to t+1, executing an action for time t+1 and monitoring the reward at time t+1 and a state at time t+1, calculating the average reward over time t, and calculating a correction factor based on the reward at time t+1 minus and the risk aversion coefficient until the end state is met.

In one embodiment, the Q table may be initialized to an arbitrary value.

In one embodiment, wherein the Q table may map a plurality of actions and a plurality of results.

In one embodiment, the end state may be based on a number of time steps, a condition being reached, the correction factor changing by less than a predetermined amount, etc.

In one embodiment, the correction factor may be calculated using the following equation:

$$\alpha_t \left( R_{t+1} - \frac{\beta}{2} (R_{t+1} - \bar{R}(s_t, a_t))^2 \right)$$

where: $\alpha_t$ is a learning rate; R is the reward; $\beta$ is the risk aversion coefficient; and $\bar{R}$ is the average reward over time t.

In one embodiment, the method may further include: outputting a risk-sensitive policy including the correction factor; receiving real-time state data and a plurality of actions; and selecting an action from the plurality of actions using the risk-sensitive policy including the correction factor.

In one embodiment, the action may include at least one of a pricing and a trade. In one embodiment, the reward may include a profit or a loss.

According to another embodiment, a method for a method for training a risk-sensitive reinforcement learning policy may include: (1) a risk-sensitive learning engine comprising at least one computer processor calculating, from an initial distribution parameter, an experience replay table, a number of distribution gradient steps, and a number of Stochastic Gradient Descent (SGD) samples, calculating an approximation of an optimal distribution parameter; (2) the risk-sensitive learning engine receiving, from a data source, a plurality of sets of training data for a plurality of time steps, each set of training data comprising an initial state, an action, a reward, and a state at the next time step; (3) the risk-sensitive learning engine receiving a risk aversion coefficient; and (4) for each time step t: (a) the risk-sensitive learning engine calculating, for a training budget comprising a number of episodes, a parametric approximation of an average reward over time for the training data; (b) the risk-sensitive learning engine calculating a correction factor based on the reward at time t+1, the parametric approximation of the average reward over time, and the risk aversion coefficient, wherein the correction factor minimizes stochasticity for the reward based on the risk aversion coefficient; and (c) increasing time t to t+1, executing an action for time t+1 and monitoring the reward at time t+1 and a state at time t+1, calculating the parametric approximation of an average reward over time t, and calculating the correction factor based on the reward at time t+1 minus and the risk aversion coefficient until an end state is met.

In one embodiment, the end state may be based on a number of time steps, a condition being reached, the correction factor changing by less than a predetermined amount, etc.

In one embodiment, the correction factor may be calculated using the equations:

$$v_{t,b} := \sum_{t'=t}^{T_b-1} \gamma^{t'-t} R_{t'+1}^{(b)} - \frac{\beta}{2} \gamma^{2(t'-t)} \left( R_{t'+1}^{(b)} - \hat{R}_\psi(s_{t'}^{(b)}, a_{t'}^{(b)}) \right)^2$$

$$V_b \leftarrow \sum_{t'=0}^{T_b-1} \nabla \ln \pi_{\theta_n}(a_{t'}^{(b)} \mid s_{t'}^{(b)}) v_{t,b}$$

where: β is the risk aversion coefficient; R is the reward; t' is a second time step; k is the parametric approximation of the average reward over time t; t' is a time index based on time t; s is a state at time index t'; a is an action at time index t'; and b is the number of episodes.

In one embodiment, the method may further include outputting a risk-sensitive policy including the correction factor; receiving real-time state data and a plurality of actions; and selecting an action from the plurality of actions using the risk-sensitive policy including the correction factor.

In one embodiment, the action may include at least one of a pricing and a trade. In one embodiment, the reward may include a profit or a loss.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for risk-sensitive reinforcement learning. Risk-sensitive reinforcement learning aims at refining classical reinforcement learning by maximizing more subtle criteria that depend in addition on the variability of the future gains (and not only their expected value), such as the randomness/risk contained within them.

Embodiments may include a risk-sensitive reinforcement learning framework that provides a decomposition of the variability/randomness contained in the cumulative reward (e.g., future gains). This decomposition provides an insight into the various nature of variability/randomness contained in the unknown future gains.

Embodiments may include algorithms that are sensitive to the "chaotic" portion of the future gains, e.g., the unpredictable part of the variability contained within them. The resulting learned policies are intuitive and interpretable as they are sensitive to the "uncertainty of the future" when a certain action is chosen, which is a natural human behavior that is adopted in many real-world situations. Embodiments may focus on the unpredictable part of the variability contained in the future gains, and not on the whole variability which mixes various sources of uncertainty together, in order to gain interpretability and subtlety in the learned policies.

Embodiments may be used with over the counter (OTC) markets. OTC refers to the process of how assets are traded for companies that are not listed on a formal exchange, but rather via a broker-dealer network. The description below uses the example where the underlying asset is of foreign exchange (FX) type, but it holds also for other types of assets, such as Equities.

For example, market makers play an important role in providing liquidity to markets (buyers and sellers—referred to as investors) by quoting prices to them of assets such as EUR/USD at which they are willing to buy and sell. Investors, who come to the market to execute their orders, observe these prices and select the market maker they want to trade with. Market makers and investors interact directly with each other, and only observe the transactions that they are involved in, plus possibly reference price information from exchanges, like EBS or Reuters. A marker maker's policies around pricing and risk management in this market depend on its objectives and preferences (e.g., how risk averse it is), the policies of competing market makers, the overall market environment (e.g., volatility) and trade flow from investors.

At any point in time, a market maker has accumulated a net position resulting from all the buy and sell trades done with investors up to this point in time, as well as some market-specific information (e.g., overall market volatility, past trade flow from investors, etc.), and needs to decide:

(a) which prices—buy and sell—to give to each investor (pricing). It is to be noted that a market maker can choose to give different prices to different investors. If the market maker's accumulated net position is, for example, positive, the market maker may choose to give more attractive prices on the sell side so that the market maker is able to sell more easily to investors and reduce its (absolute) net position, hence lowering its sensitivity to underlying asset price move. This process of providing asymmetric prices on the buy and sell sides in order to better manage risk is referred to as skewing; and (b) whether to go directly on the market (e.g., to another market maker or to an exchange) and directly buy or sell some quantity of the asset, in order to reduce the market maker's (absolute) net position, hence lowering the market maker's sensitivity to the underlying asset price move. This process is referred to as hedging, and is typically expensive (the market maker pays the price to have his trades executed immediately).

The choice of (a) and (b) constitutes a market maker's policy. A market maker has to choose its policy (pricing and hedging) subject to uncertainty of the future inherent to the market. For example, when a price is chosen, the market maker does not know how many investors will come to it and execute trades at that price, or the quantity of those trades (response function). Further, the market maker is also subject to uncertain underlying asset price move over time. Hence, uncertainty of the future when an action is chosen (e.g., set a price to a certain level, or sell a certain quantity of the asset) is crucial and needs to be incorporated into reinforcement learning algorithms.

The novel algorithms disclosed in the "Risk-Sensitive Reinforcement Learning: A Martingale Approach to Reward Uncertainty," Vadori, N., Ganesh, S., Veloso, M., 2020, ICAIF 2020: ACM International Conference on AI in Finance (available at https://arxiv.org/abs/2006.12686), the disclosure of which is hereby incorporated, by reference, in its entirety, (cf. algorithm 1 CMV-Q-Learning, algorithm1 2 CMV-REINFORCE, algorithm 4 CMV-Actor-Critic episodic case, algorithm 5 CMV-Actor-Critic average reward case) disclose algorithms and methods for learning policies via reinforcement learning that have the to take into account the variability of the future profits and losses linked to the uncertainty of the future when a specific action is chosen (referred to as chaotic risk).

In embodiments, the algorithms may focus only on the unpredictable part of the variability contained in the future profits, and not on the whole variability which mixes various sources of uncertainty together, in order to gain interpretability and subtlety in the learned policies.

In embodiments, training may occur as follows. In order to learn policies via reinforcement learning, three concepts are defined: the state space, the action space, and the reward function. The state space refers to which information is available to the market maker at a certain point in time. This may include the investor trade flow recorded in the past associated to certain prices that were offered to the investors, the current net position of the market maker, market specific information (e.g., such as estimates of the volatility and statistical properties of the underlying asset), external constraints such as risk limits, etc.

The action space includes the actions are available for the market maker to execute, e.g., the buy/sell prices the market maker is able to give to investors and the quantity of the underlying asset that the market maker is able to buy/sell. Specific prices may be associated to specific quantities. The actions may be constrained by, for example, risk limits.

The reward function describes the profits and losses incurred by the market maker as the states and actions change, and may include also contain some extra randomness due to external phenomena.

In order to train the policy, a simulator that has calibrated parameters may be used to reflect as accurately as possible the data available to the market maker (e.g., investor flow data and other investor specific data, underlying asset price statistics such as volatility, client specific data, external constraints such as risk limits, etc.). A simulator may mimic how the state evolves when certain actions are performed, and will generate the reward function over time. This way, the reinforcement learning algorithm may explore a wide variety of actions in order to eventually converge to the optimal policy, without the fear of losing money (as the policy is trained in a simulator).

The risk-sensitive algorithms typically depend on risk parameters describing how risk-averse the market maker is. The choice of these parameters is up to the market maker. A policy is said to have converged when typically, the improvement in the profit function it is trying to maximize becomes marginal.

Once the training of the policy has been performed, the policy may then be used as such on the real market. In embodiments, the policy may not be modified once it has been trained.

It should be noted that although embodiments are disclosed in the context of market makers, investors, investments, and financial transactions, the disclosure is not so limited, and may be implemented to train policies in situations where there is risk sensitivity. For example, embodiments may be used in trading (e.g., buying or selling) an asset, such as a stock, on a centralized limit order book, where the order book is open for all to see, and all transaction take place at this centralized limited order book, determining the optimal execution of an asset over a time period [e.g., $t_{start}$, $t_{end}$]: given that party A holds a quantity Q of the asset at initial time $t_{start}$, how should party A optimally sell it so that party A has sold the asset at time $t_{end}$ (e.g., should party A it evenly at all timesteps in between $t_{start}$ and $t_{end}$), etc.

Figure 1:
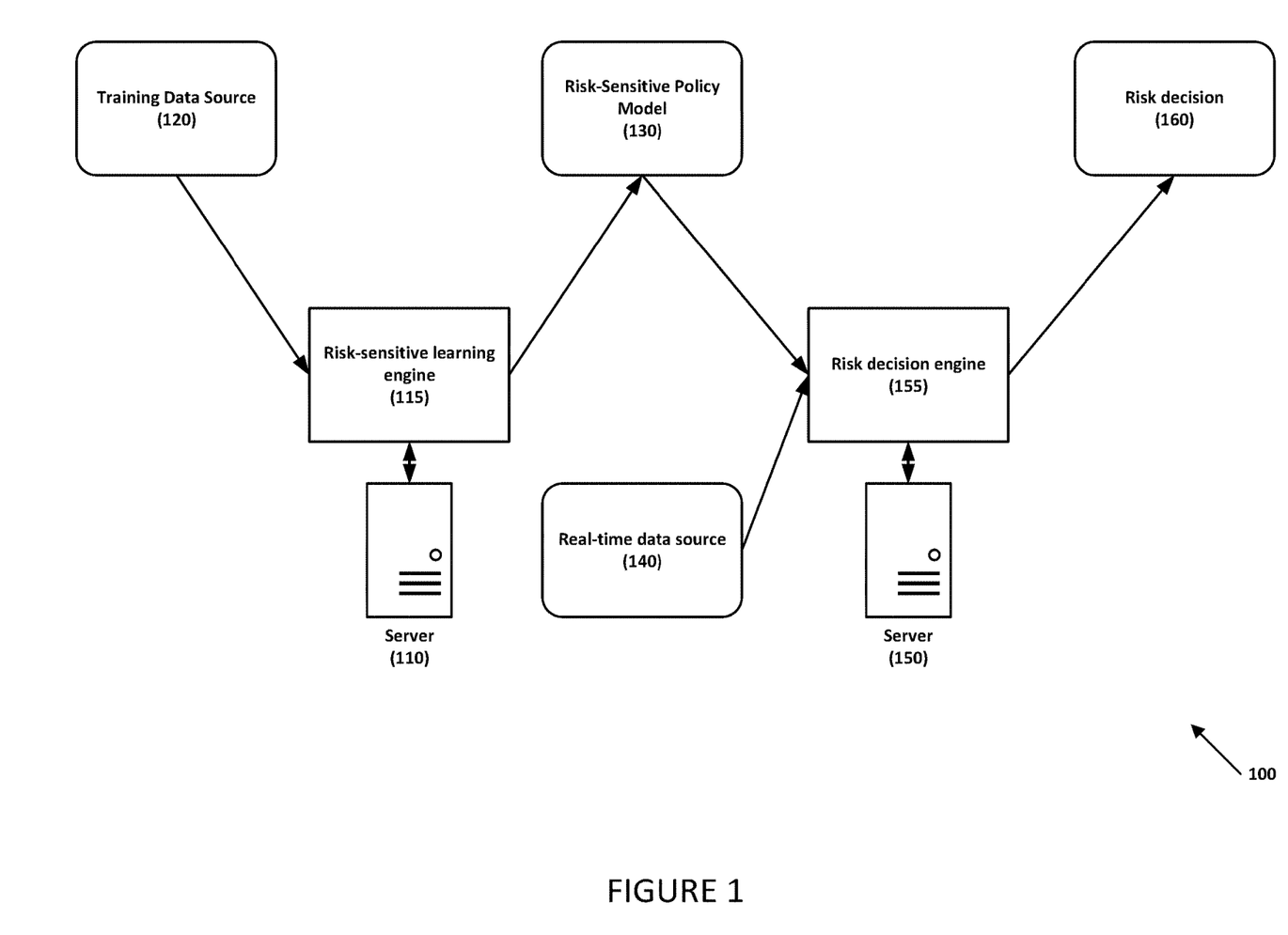
FIG. 1 depicts a system for risk-sensitive reinforcement learning according to an embodiment.

Referring to FIG. 1, a system for risk-sensitive reinforcement learning is disclosed in one embodiment. System 100 may include server 110 that may execute risk-sensitive learning engine 115, which may be a computer program or application executed in a memory (not shown). Server 110 may be any suitable electronic device, including physical servers, cloud-based servers, combinations thereof, etc.

Risk-sensitive learning engine 115 may receive, as an input, training data from training data source 120. Training data may include, for example, sets of data comprising for a plurality of time steps, with each time step having an initial state at time t ($s_t$), an action at time t ($a_t$) (which may include a vector comprising a plurality of actions), and a reward at time t, which may be positive or negative, for the action. The time step may also include the state for time t+1 (i.e., $s_{t+1}$). In one embodiment, training data source 120 may include past actual data, synthetic data, real-time data, etc. The training data may be used to train risk-sensitive learning engine 115 for risk-sensitive policy model 130.

In one embodiment, if real-time, real-world data is used, there may be a penalty (e.g., a financial penalty as the policy is trained), as well as a timing penalty as a number of time steps are needed to learn the correction factor.

In one embodiment, risk-sensitive learning engine 115 may be a simulator, such as that disclosed in "Reinforcement Learning for Market Making in a Multi-Agent Dealer Market," Ganesh, S., Vadori, N., Xu, M., Zheng, H., Reddy, P., Veloso, M. NeurIPS 2019 Workshop on Robust AI in Financial Services (available at http://arxiv.org/abs/1911.05892), the disclosure of which is hereby incorporated, by reference, in its entirety.

For example, in an investment scenario, training data may include market data. Other types of training data may be used as is necessary and/or desired.

Risk-sensitive policy model 130 may be an input to risk decision engine 155, which may be a computer program or application executed by server 150. Server 150 may be any suitable electronic device, including physical servers, cloud-based servers, combinations thereof, etc.

In one embodiment, server 110 and server 150 may be the same server.

Risk decision engine 155 may receive real-time data from real-time data source 140, such as sources of market data, and may apply risk-sensitive policy model 130 to the real-time data and may output a risk decision.

Figure 2:
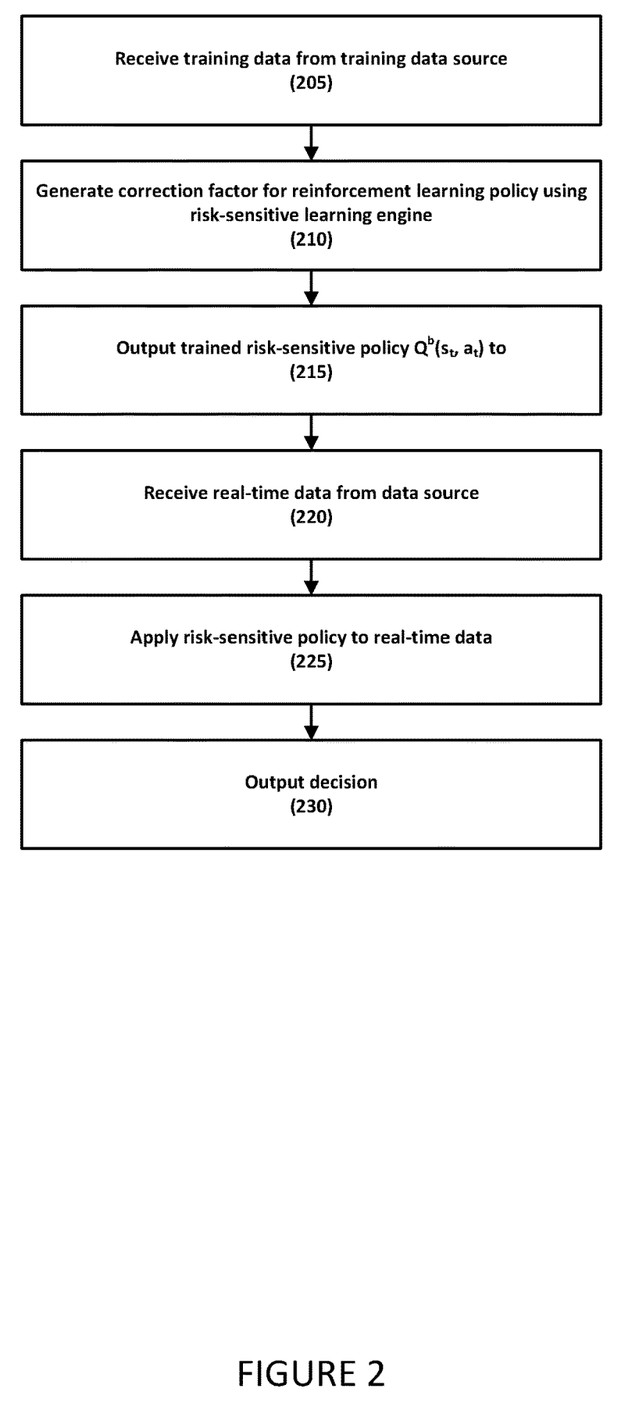
FIG. 2 depicts a method for risk-sensitive reinforcement learning according to an embodiment.

Referring to FIG. 2, a method for risk-sensitive reinforcement learning is disclosed according to an embodiment.

In step 205, a risk-sensitive learning engine that may be executed by an electronic device, such as a server, may receive training data from training data source. For example, the training data source may be a source of market data, real-time data, synthetic data, etc.

In step 210, using the training data, the risk-sensitive learning engine may generate a correction factor to apply to a reinforcement learning policy. In one embodiment, an episodic reinforcement learning process may be used, including Q-learning, policy gradient, etc.

Figure 3:
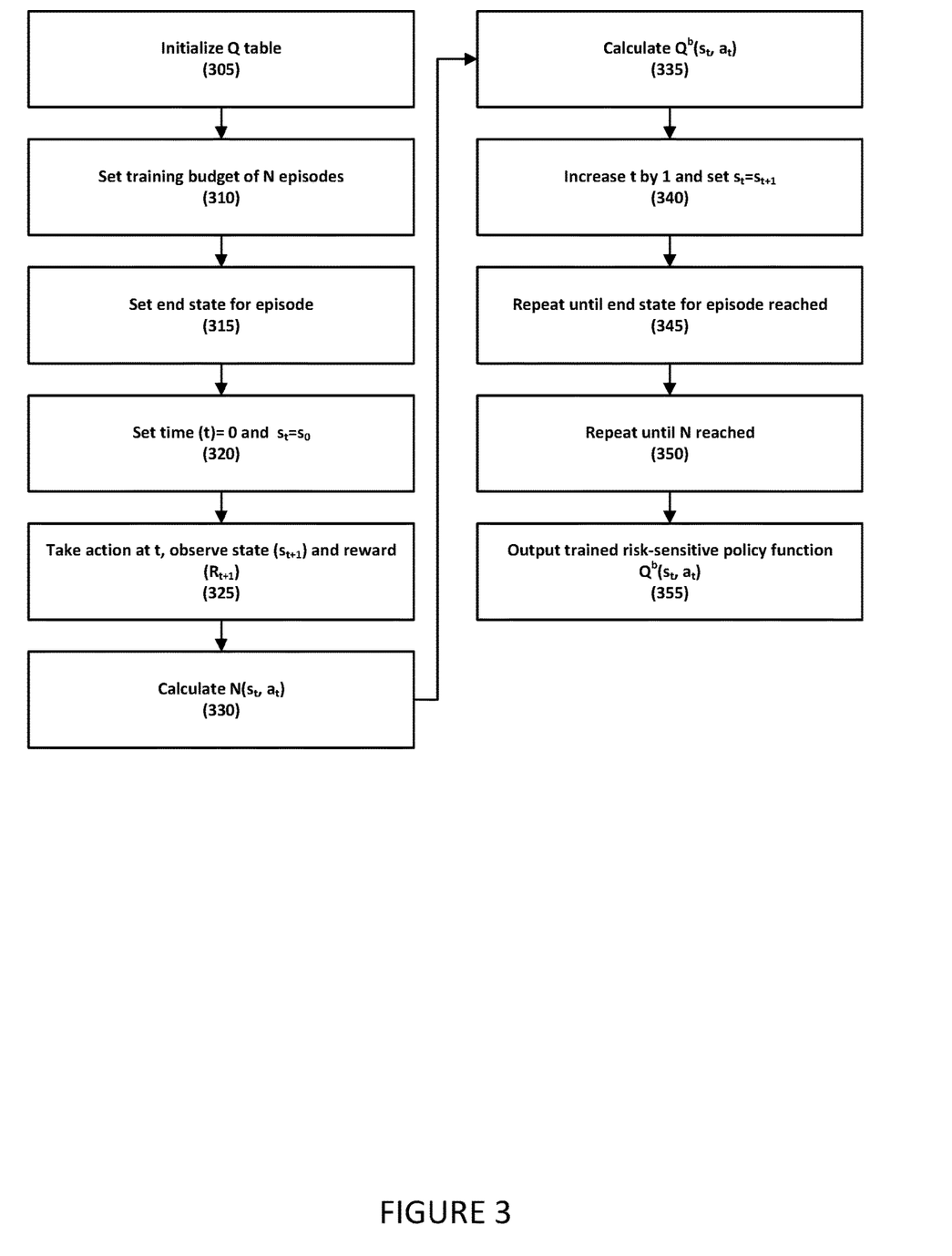
FIG. 3 depicts a method for generating a correction factor for a risk-sensitive reinforcement policy is disclosed according to an embodiment.

Referring to FIG. 3, a method for generating a correction factor for a risk-sensitive policy is disclosed according to an embodiment. Although embodiments may be described in the context of a Q-learning reinforcement learning, the method may be applied to other reinforcement learning policies, such as risk gradient reinforcement learning.

In one embodiment, Q-learning may be used when there is a finite number of actions that may be taken at each state. Thus, the correction factor may be calculated more accurately. If there are large number of actions that may be taken at each state, an approximation of a correction factor may be calculated. In one embodiment, the accuracy of the approximation may be considered in determining whether to use the approximation of the correction factor.

An example process for generating the approximation of the correction factor is discussed in greater detail below.

For example, a correction factor for a Q-learning risk-sensitive policy $Q^\beta(s_t, a_t)$ may be calculated. As used herein, $\beta$ represents a risk aversion coefficient, $s_t$ represents a state (e.g., what can be observed) at time t, and $a_t$ represents one or more action at time t. In a financial scenario, examples of states may include an inventory, pricing, market data, etc., and examples of actions may include investments, trades, etc.

In one embodiment, a $\beta$ value of 0 indicates that rewards (R) will have a greater variability than if $\beta$ is set to a value greater than 0.

In step 305, in a Q-learning process, a Q table may be initialized. In one embodiment, the Q table may be initialized to an arbitrary value. The Q table may include a plurality of states, and a plurality of actions for that state.

In step 310, a training budget may be set. In one embodiment, the training budget may include N iterations, and each iteration may have a plurality of time steps.

In step 315, the end state for the episode may be set. In one embodiment, the end state may be a number of time steps. In another embodiment, the end state may be when a condition is reached, such as the change to $Q^\beta$ is below a certain threshold.

In step 320, the time (t) may be set to zero, and the state ($s_t$) may be set to an initial state ($s_0$).

In one embodiment, the learning rate ($\alpha$) may be set according to conventional reinforcement learning techniques.

In step 325, a computer program may take action $a_t$ and may observe state $s_{(t+1)}$ and reward $R_{(t+1)}$. In one embodiment, action $a_t$ may be taken in a simulator. In another embodiment, action $a_t$ may be taken in a real-world environment.

In one embodiment, state $s_{(t+1)}$ may represent the result of the action, such as a price of an investment changing, executing a trade, etc., and $R_{(t+1)}$ may represent the reward associated with action $a_t$, such as a profit, a loss, etc. Other actions and rewards may be considered as is necessary and/or desired.

In one embodiment, $R_{(t+1)}$ may represent a reward that has been corrected using the correction factor.

In step 330, $N(s_t, a_t)$ may be calculated by the computer program. In one embodiment, $N(s_t, a_t)$ may be calculated using the following equation:

$$N(s_t, a_t) \leftarrow N(s_t, a_t) + 1;$$

$$\bar{R}\big(N(s_t, a_t) \leftarrow \bar{R}N(s_t, a_t) + \frac{1}{N(s_t, a_t)}(R_{t+1} - \bar{R} \mid (s_t, a_t))$$

In this equation, $\bar{R}(s, a)$ represents an average of rewards R over time t, related to state s and action a.

In step 335, $Q^\beta(s_t, a_t)$ may be calculated by the computer program using the following equation that includes the correction factor based on b, the expected reward $R_{t+1}$, and the average reward over time $\bar{R}$:

$$Q^\beta(s_t, a_t) \leftarrow$$
$$(1-\alpha_t)Q^\beta(s_t, a_t) + \alpha_t\left(R_{t+1} - \frac{\beta}{2}(R_{t+1} - \bar{R}(s_t, a_t))^2 + \max_a Q^\beta(s_{t+1}, a_t)\right)$$

This equation uses the reward ($R_{t+1}$) and adjusts it to minimize stochasticity based on the value for $\beta$. For example, if b equals 0, this term is eliminated. For values of $\beta$ greater than 0, the average reward is subtracted from the expected reward, which effectively penalizes actions that lead to high variability in reward R. This correction factor is learned over time.

In step 340, time (t) may be increased by one by the computer program, and $s_t$ may be set to equal $s_{t+1}$ by the computer program.

In step 345, t may be increased and the process repeated until the end state for the episode is met. Then, in step 350, the process may be repeated until the training budget N is reached.

Referring again to FIG. 2, in step 215, the risk-sensitive learning engine may output the risk-sensitive policy with the correction factor $Q^\beta(s_t, a_t)$ to a risk engine, and, in step 220, a risk engine may receive real-time data from a data source.

In step 225, the risk engine may apply the risk-sensitive policy with the correction factor $Q^\beta(s_t, a_t)$ to the real-time data. For example, a state and an action may be input to risk-sensitive policy $Q^\beta(s_t, a_t)$ and it may return an expected reward for taking action $a_t$ at state $s_t$. This yields the expected rewards over time for action $a_t$.

In another embodiment, the risk engine may receive a goal R, and may identify the action(s) a to take to achieve goal R from the current state (s).

In one embodiment, the output of the risk-sensitive policy including the correction factor may be used to automatically take an action, such as setting a price, conducting a trade, etc., as is necessary and/or desired.

Figure 4:
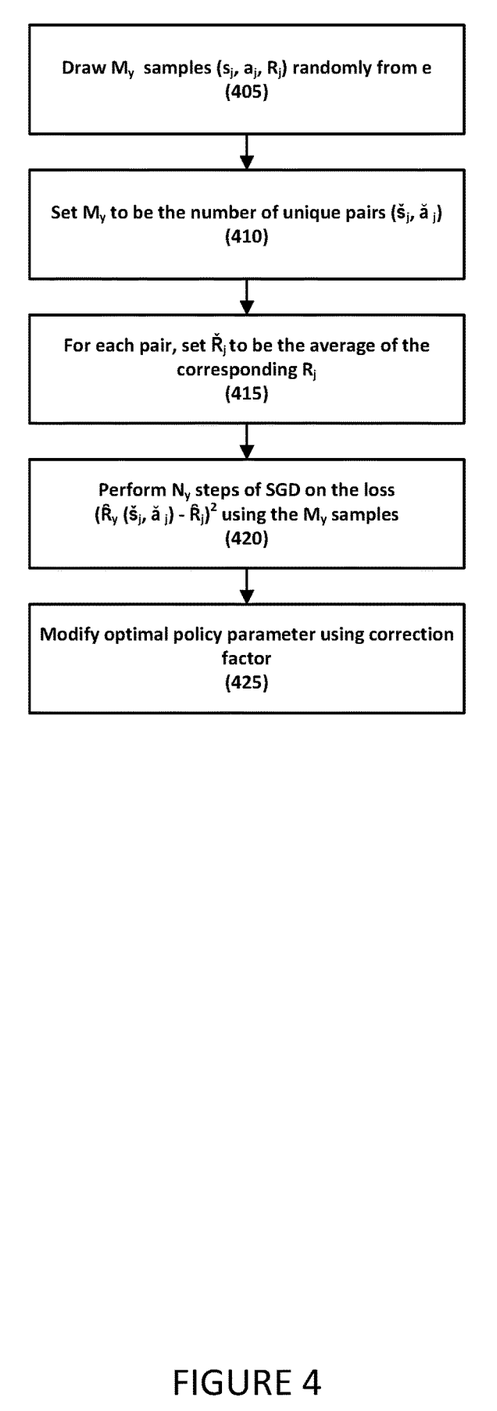
FIG. 4 depicts a method for generating a correction factor for a risk-sensitive reinforcement policy is disclosed according to another embodiment

In another embodiment, referring to FIG. 4, a parametric approximation may be used to generate a correction factor. For example, an approximation of an optimum distributional parameter $\psi^*$ may be based on an experience replay table e, a number of distributional gradient steps $N_\psi$, and a number of Stochastic Gradient Descent (SGD) samples $M_\psi$.

In step 405, $M_\psi$ samples ($s_j$, $a_j$, $R_j$) may be randomly drawn from an experience replay table E.

In step 410, the average $M_\psi$ may be set to the number of unique pairs ($s_j$, $a_j$).

In step 415, for each pair, average $R_j$ may be set to the average of the corresponding $R_j$.

In step 420, $N_\psi$ steps of SGD may be performed on the loss ($R_\psi$ (($s_j$, $a_j$)—average $R_j$)$^2$ using the average $M_\psi$ samples.

In step 425, an initial policy parameter $\theta_0$ may be modified to provide an approximation of the optimal policy parameter $\theta^*$ using a similar correction factor as discussed above. For example, For example, for a number of B episodes, the following equations may reduce stochasticity in the optimal policy:

$$v_{t,b} := \sum_{t'=t}^{T_b-1} \gamma^{t'-t} R_{t'+1}^{(b)} - \frac{\beta}{2}\gamma^{2(t'-t)}\big(R_{t'+1}^{(b)} - \hat{R}_\psi(s_{t'}^{(b)}, a_{t'}^{(b)})\big)^2$$

$$V_b \leftarrow \sum_{t'=0}^{T_b-1} \nabla \ln \pi_{\theta_n}(a_t^{(b)} \mid s_t^{(b)}) v_{t,b}$$

$$\theta_{n+1} \leftarrow \theta_n + \alpha_n B^{-1} \sum_{b=1}^{B} V_b$$

By including th correction factor $$\frac{\beta}{2}\gamma^{2(t'-t)}(R_{t'+1}^{(b)} - \hat{R}_\psi(s_{t'}^{(b)}, a_{t'}^{(b)}))^2,$$

stochasticity may be reduced as the correction factor penalizes high stochasticity.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
a risk-sensitive learning engine comprising at least one computer processor receiving, from a data source, a plurality of sets of training data for a plurality of time steps, each set of training data comprising an initial state, an action comprising a trade, a reward, and a state at the next time step;
the risk-sensitive learning engine generating a correction factor for a risk sensitive policy using a Q-learning process by:
initializing a Q table;
receiving a training budget comprising a plurality of episodes, a risk aversion coefficient, and an end state; and
for each episode in the episode in the training budget:
setting the end state for the episode;
setting a time to zero and a state to an initial state;
executing the action for time t and monitoring a reward at t+1 and a state at time t+1, wherein the reward at t+1 and the state at t+1 are results of the action at time t;
the risk-sensitive learning engine increasing time t by one;
the risk-sensitive learning engine executing the action for time t and monitoring a reward at time t+1 and a state at time t+1, wherein the reward at t+1 and the state at t+1 are results of the action at time t;
the risk-sensitive learning engine calculating an average reward over time t;
the risk-sensitive learning engine calculating the correction factor based on the reward at time t+1, the average reward over time, and the risk aversion coefficient, wherein the correction factor minimizes stochasticity for the reward based on the risk aversion coefficient; and repeating the steps of increasing time t by one, executing the action for time t+1 and monitoring the reward at time t+1 and a state at time t+1, calculating the average reward over time t, and calculating the correction factor based on the reward at time t+1 and the risk aversion coefficient until the end state is met;

the risk-sensitive learning engine outputting a trained risk-sensitive policy function with the correction factor to a risk engine;

the risk engine receiving real-time data from the data source;

the risk engine applying the trained risk-sensitive policy function with the correction factor to the real-time data;

the risk engine executes an action based on an output of the applying.

2. The method of claim 1, wherein the Q table is initialized to an arbitrary value.

3. The method of claim 2, wherein the Q table maps a plurality of actions and a plurality of results.

4. The method of claim 1, wherein the end state is based on a number of time steps.

5. The method of claim 1, wherein the end state is based on a condition being reached.

6. The method of claim 5, wherein the condition is based on the correction factor changing by less than a predetermined amount.

7. The method of claim 1, wherein the correction factor is calculated using the following equation:

$$\alpha_t \left( R_{t+1} - \frac{\beta}{2}(R_{t+1} - \bar{R}(s_t, a_t)) \right)^2$$

where:
$\alpha_t$ is a learning rate;
R is the reward;
$\beta$ is the risk aversion coefficient; and
$\bar{R}$ is the average reward over time t.

8. The method of claim 1, wherein the reward comprises a profit or a loss.

9. A method, comprising:
a risk-sensitive learning engine comprising at least one computer processor receiving, from a data source, a plurality of sets of training data for a plurality of time steps, each set of training data comprising an initial state, an action comprising a trade, a reward, and a state at the next time step;

the risk-sensitive learning engine generating a correction factor for a risk sensitive policy using a parametric approximation by:
calculating, from an initial distribution parameter, an experience replay table, a number of distribution gradient steps, and a number of Stochastic Gradient Descent (SGD) samples, an approximation of an optimal distribution parameter;

the risk-sensitive learning engine receiving a risk aversion coefficient; and for each time step t:
the risk-sensitive learning engine calculating, for a training budget comprising a number of episodes, a parametric approximation of an average reward over time for the training data;

the risk-sensitive learning engine calculating the correction factor based on the reward at time t+1, wherein the reward at t+1 is a result of the action at time t, the parametric approximation of the average reward over time, and the risk aversion coefficient, wherein the correction factor minimizes stochasticity for the reward based on the risk aversion coefficient; and increasing time t by one, executing the action and monitoring the reward at time t+1 and a state at time t+1, calculating the parametric approximation of an average reward over time t, and calculating the correction factor based on the reward at time t+1 and the risk aversion coefficient until an end state is met;

the risk-sensitive learning engine outputting a trained risk-sensitive policy function with the correction factor to a risk engine;

the risk engine receiving real-time data from the data source;

the risk engine applying the trained risk-sensitive policy function with the correction factor to the real-time data;

the risk engine executes the action based on an output of the applying.

10. The method of claim 9, wherein the end state is based on a number of time steps.

11. The method of claim 9, wherein the end state is based on a condition being reached.

12. The method of claim 9, wherein the condition is based on the correction factor changing by less than a predetermined amount.

13. The method of claim 11, wherein the correction factor is calculated using the equations:

$$v_{t,b} := \sum_{t'=t}^{T_b-1} \gamma^{t'-t} R^{(b)}_{t'+1} - \frac{\beta}{2} \gamma^{2(t'-t)} \big(R^{(b)}_{t'+1} - \hat{R}_\psi(s^{(b)}_{t'}, a^{(b)}_{t'})\big)^2$$

$$V_b \leftarrow \sum_{t'=0}^{T_b-1} \nabla \ln \pi_{\theta_n}(a^{(b)}_t \mid s^{(b)}_t) v_{t,b}$$

where:
$\beta$ is the risk aversion coefficient;
R is the reward;
t' is a time index based on time t;
$\hat{R}$ is the parametric approximation of the average reward over time t;
s is a state at time index t';
a is an action at time index t'; and
b is the number of episodes.

14. The method of claim 9, wherein the reward comprises a profit or a loss.

* * * * *